Patented Jan. 21, 1936

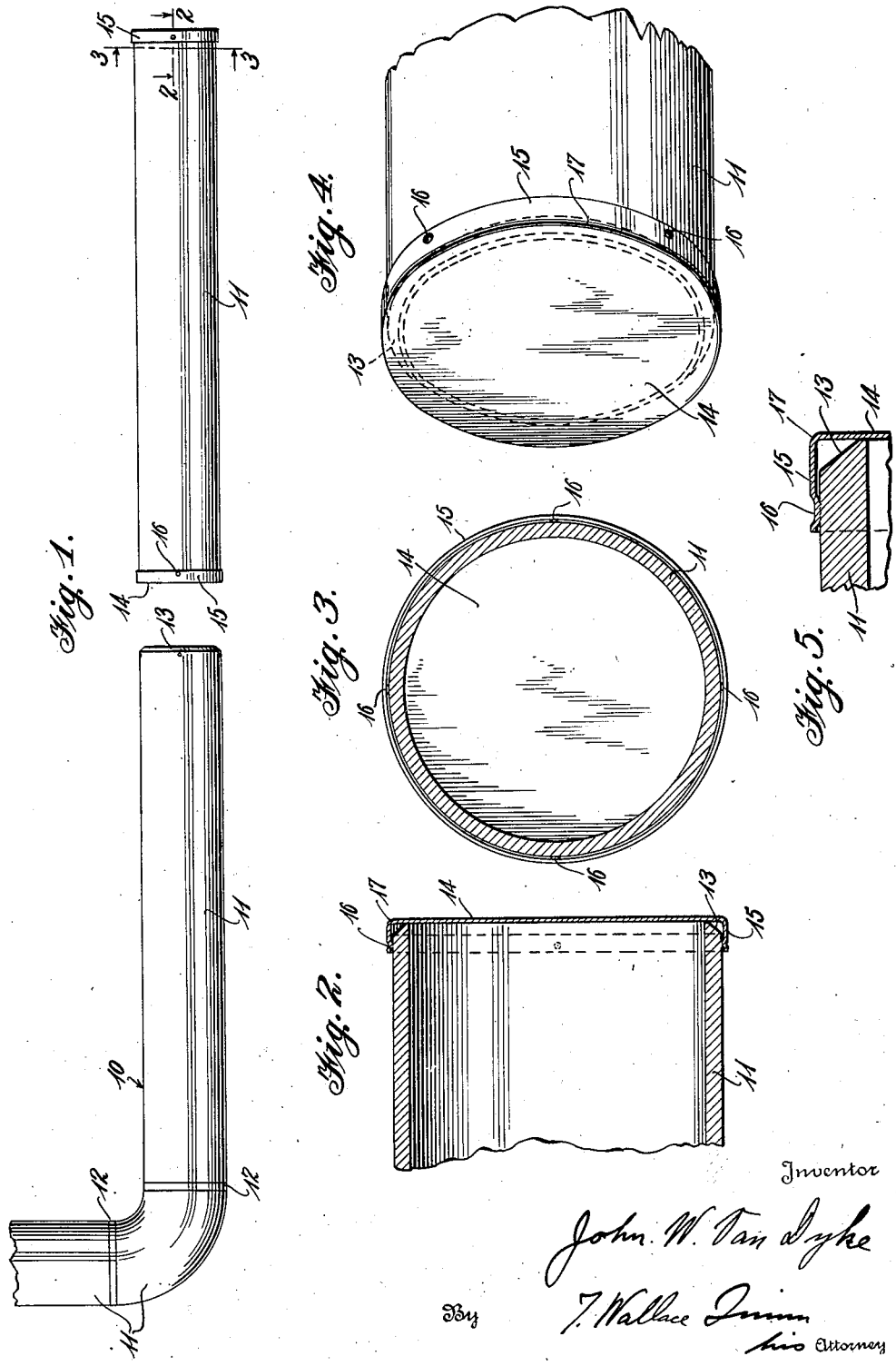
Jan. 21, 1936.    J. W. VAN DYKE    2,028,576
PIPE SECTION PROTECTION
Filed Aug. 1, 1935

2,028,576

UNITED STATES PATENT OFFICE 2,028,576

PIPE SECTION PROTECTION

John W. Van Dyke, Philadelphia, Pa.

Application August 1, 1935, Serial No. 34,177

2 Claims. (Cl. 138—96)

This invention relates to pipes, conduits and the like and to a method of handling the same in the construction of pipe systems. More particularly this invention is concerned with the manufacture of pipes, conduits and the like which have end closure portions. The end closure portions are so formed that they are capable of being removed from the pipe sections so as to expose their bores and their respective surfaces near their ends. When the end closure portions have been removed from a section, the section is then ready for incorporation into a system with its bore free of foreign matter and with its beveled welding surfaces or other type of pipe ends uninjured and in condition for connection to other sections, for example, by a welding operation.

On numerous occasions in the past it has been found that after installing large pipe systems, certain portions of the system have refused to function properly because they were partially or wholly plugged by foreign material which had gotten into the separate pipe sections during transportation or storage and, for example, due to the carelessness of the workmen, had not been removed from the sections prior to the incorporation thereof into the system. Foreign matter has often become lodged in pipe or conduit sections, particularly when large lines were being installed. Sometimes a tool or piece of equipment inadvertently or maliciously became placed in a section during the storage or handling of the same. The difficulty which resulted because of the existence of foreign matter in pipe sections that had been incorporated in the system has been encountered on so many occasions that it has become quite customary to have workmen prepare wooden plugs or stoppers and to drive one into each end of the pipe sections with the view to excluding foreign matter from their interiors. While such plugs have proven to be helpful, they have not proven entirely satisfactory for the reason that the plugs are comparatively expensive to produce, particularly for large pipes or conduits. Furthermore, such plugs have been found to be difficult to remove since they are driven tightly into the sections, and in overcoming the resistance to removal, they have often been splintered and sometimes foreign matter in the form of splinters has been retained within the sections and has caused difficulty in the operation of the system into which such sections were installed. Also, in inserting and removing such plugs into and from the section ends, such ends are often knocked out of round. Then, too, the use of wooden plugs does not provide for the protection against mechanical damage, corrosion or rusting of the beveled or other type of welding surface which is formed adjacent each end of the sections. In fact these surfaces are often injured in effecting removal of wooden plugs or the like.

Heretofore the problem of protecting threads on the ends of small pipes has been recognized and metal caps have been provided for the purpose of protecting them. In some instances the caps are frictionally engaged upon the pipe ends, while in other instances the caps are secured by tongues or by soft metal inserts which are pressed against the threads through holes formed in the skirt portions of the caps. However, no devices have heretofore been provided which will satisfactorily protect the welding surfaces of large pipe or conduit sections, and which are capable of being relatively easily removed and yet are normally so securely maintained in position on the sections that they are not jarred free or dislodged therefrom during normal handling and/or storage.

The present invention has as an object the provision of a pipe or conduit section which is closed at each end by a cap, for example, of pressed metal, each of the caps overlying a beveled or other type of welding surface at an end of the section, and each cap being secured adjacent the inner edge of said surface over which it lies by means of welding. This invention also contemplates the formation of a pipe or conduit section wherein the caps do not frictionally engage relatively large surfaces of the section, and are therefore capable of ready removal upon the rupturing of the welded points of connection.

It is a further object of this invention to provide a process for handling pipe sections and forming them into a system, whereby such sections may be stored and transported while the interiors thereof are maintained free of foreign matter and the welding surfaces adjacent the ends thereof are protected from injury by caps which may be removed by blows of an instrument at the point of installation, whereupon the sections are then joined to the remainder of the system.

Additionally, the invention provides for a protecting cap particularly for large size pipes and the like, which has a flange of such length that it will terminate beyond the inner edge of the normal beveled surface or other surface to be protected at the end of a pipe to which it is applied, with a sufficient portion overlying and contacting with the exterior surface of the pipe for permitting a welded connection to be made between the cap and pipe. Furthermore, caps in accordance with the present invention, act as supports or braces for the ends of the pipe sections, thereby minimizing or preventing such ends from becoming out of round during the handling thereof.

Other objects and advantages will be apparent from the following detailed description when considered in connection with the accompanying drawing, wherein:

Fig. 1 illustrates a pipe section in the course of being installed into a welded pipe system, in which such section has its ends and interior protected by caps formed as a part thereof or affixed thereto;

Fig. 2 is a vertical sectional view taken on line 2—2 of Fig. 1, and illustrates a cap in place upon an end of a pipe section;

Fig. 3 is a cross sectional view of a pipe section taken on line 3—3 of Fig. 1, illustrating the manner of rendering the pipe section and cap unitary by welding at a plurality of points;

Fig. 4 is a perspective view of an end of a pipe section with the cap formed as a part thereof in accordance with this invention, and Fig. 5 is an enlarged detail fragmentary sectional view.

Now referring to the drawing in detail, the numeral 10 designates a pipe system in the course of installation. The pipe as illustrated is of the large diameter type usually employed in oil refineries or fluid pipe lines, and the sections of pipe 11 are connected together by welding as indicated at 12.

Pipe sections 11 are preferably formed in the usual way so as to be capable of withstanding the pressures and temperatures to which they are subjected in the operation of the systems into which they are to be incorporated, and each section is formed at its ends with tapered or beveled welding surfaces 13, which as shown are for purpose of illustration.

Subsequent to the formation of the pipe sections 11 and the tapering or other preparation of the welding surface of the same at their respective ends, and after it is ascertained that the bores of the sections and their welding surfaces are free of foreign matter and undamaged, a cap member 14 is applied over each end of the sections. Cap members 14 are preferably formed of sheet metal by a stamping operation, and the flanges 15 thereof have an inside diameter substantially equal to the outside diameter of the sections 11 immediately adjacent the edge of the welding surfaces 13 thereof.

Cap members 14, for example, may be secured to the ends of the pipe sections at the pipe manufacturing plant or they may be placed on and secured to the pipe sections at the place of storage after it has been definitely ascertained that the bores of the sections and their welding surfaces are in proper condition for handling and installation by the usual crew of workmen.

After the cap members 14 have been placed over the ends of the pipe sections they are united thereto, for example, by being welded at spaced points as indicated at 16 in the drawing, preferably by electrical spot welding. Or, in lieu of electric spot welding, the caps may be welded to the section ends by means of conventional arc welding or gas welding.

After the pipe sections have had the cap members 14 united thereto as shown by the section at the right portion of Fig. 1, the sections may be stored or handled without the possibility of foreign matter getting into the bores thereof; and the welding surfaces 13 are protected from damage by the annular edges 17 of the cap members 14. When it is desired to use the sections 11 they may be conveyed by means of suitable handling and transporting equipment to the immediate place of use and the cap members 14 may then be quickly removed, for example, by tapping them with a hammer or other instrument, which will cause rupture of the welded connections 16.

As shown in the drawing, the cap members 14 are formed of metal of thickness such that they may be readily handled and economically manufactured, it being intended ordinarily that relatively thin metal be utilized, since the cap members do not form a permanent part of the completed system. The gage of the metal used in making up the cap members may be determined by the size or diameter of pipe upon which the members are to be applied. For example, it has been found that 20 gauge metal is suitable for use in making caps for ordinary 8 in. pipe sections.

What I claim is:

1. A device for protecting the end of a pipe or conduit comprising a metal cap overlying the end, said cap being provided with a relatively narrow annular flange which overlies said end, said flange of the cap being secured to the pipe or conduit as an integral part thereof by means of welding.

2. A device for protecting a pipe or conduit having a large diameter body portion and a welding or other type of fastening surface adjacent one end, comprising a relatively thin metal cap overlying said end, the cap being provided with a relatively narrow annular flange which is spaced from but overlies said surface, said flange being secured to the body portions by means of welded connections arranged circumferentially thereof in spaced relation to the fastening surface, whereby the cap is normally held as an integral part of the pipe or conduit.

JOHN W. VAN DYKE.